United States Patent [19]

Gaither et al.

[11] Patent Number: 5,688,548
[45] Date of Patent: Nov. 18, 1997

[54] NON-FAT BAKING INGREDIENT AND METHOD OF MAKING

[75] Inventors: Karen S. Gaither, Akron; Rhonda W. Reitz, Medina, both of Ohio

[73] Assignee: The J. M. Smucker Company, Orrville, Ohio

[21] Appl. No.: 698,198

[22] Filed: Aug. 15, 1996

[51] Int. Cl.$^6$ ..................................................... A23L 1/035
[52] U.S. Cl. ........................... 426/577; 426/552; 426/553; 426/615; 426/626; 426/639
[58] Field of Search ...................................... 426/577, 615, 426/626, 639, 552, 553, 804

[56] References Cited

U.S. PATENT DOCUMENTS

| | | | |
|---|---|---|---|
| 2,878,127 | 3/1959 | Forkner | 426/577 |
| 5,260,083 | 11/1993 | Brain et al. | 426/577 |
| 5,324,531 | 6/1994 | Hoefler et al. | 426/804 |
| 5,422,132 | 6/1995 | Caden et al. | 426/804 |
| 5,451,420 | 9/1995 | Brain et al. | 426/573 |

*Primary Examiner*—Helen Pratt
*Attorney, Agent, or Firm*—Vickers, Daniels & Young

[57] ABSTRACT

An improved shortening substitute for food products such as bakery products. The improved shortening substitute includes a mixture of a fruit puree, a sweetener, a preservative, water, a fat mimetic, a pH adjuster and a source of calcium ions. The shortening substitute is formulated to be used in a wide variety of food products and have a 1:1 to 0.5:1 replacement value of the improved shortening substitute to oil, butter or shortening to produce high quality baked products.

61 Claims, No Drawings

NON-FAT BAKING INGREDIENT AND METHOD OF MAKING

This invention relates to the art of foods, and more particularly to a shortening and oil substitute for use in bakery goods which includes a fruit puree in combination with a fat mimetic which is formulated to reduce or eliminate the need for a shortening, a butter and/or an oil addition in a food product without sacrificing the advantages of using an oil, butter or shortening with respect to the texture, appearance and organoleptic properties of the food product.

BACKGROUND OF THE INVENTION

The present invention is particularly applicable for the use as a substitute for shortening, butter and/or oil in bakery goods such as cakes, breads, muffins, cookies and brownies; however, it can be appreciated that the shortening substitute has a wide variety of applications in the food industry and may be used in soups, salad dressings, casseroles or other types of foods which require the addition of a shortening, butter or oil.

To reduce the fat content of baked goods, it is becoming quite popular to use a fruit puree. The fruit puree is substituted for a portion or all of the shortening, butter or oil which is added to the food product. The most used fruit puree used to substitute oil, butter or shortening is applesauce. Applesauce has long been used as a substitute for oil, butter and shortening in a variety of baking goods such as cakes, cookies and breads. Other fruit purees such as apricots, plums and prunes have also been used as oil, butter and shortening substitutes in baked goods. Fruit purees have the advantage of being a naturally occurring food, which when substituted for shortening, butter and oil have produced significantly reduced caloric values of such baked goods. Although these fruit purees have gained a wider acceptance by the public, these fruit purees have had limited success in producing baked goods having the appearance, texture and taste of their shortening, butter or oil containing counterparts. Many types of baked goods such as brownies require oil or shortening to create a moist product having a fudgy texture and glossy cracked surface. The substitution of a fruit puree for oil or shortening in a brownie mix typically results in a dry, hard product having a sticky and a non-fudgy texture and a non-glossy cracked surface appearance. For light colored baked goods, the addition of certain types of fruit purees such as prune purees may tarnish or discolor the light colored foods. The use of fruit purees in baked goods can also dull the natural flavors of the baked goods and/or produce off-flavors or add undue sweetness to the baked goods. In addition, fruit puree substitutes have been essentially limited to substitution of oil, butter or shortening in specially formulated baked goods and have generally been unacceptable as an oil or shortening substitute in other food products such as salad dressings, sauces, casseroles, vegetable dishes or the like. In view of the problems associated with fruit purees as oil, butter and shortening substitutes, there has not been a rapid acceptance by the public of such products as a viable substitute for oil, butter and shortening.

As a result of the problems associated with use of fruit purees as oil, butter and shortening substitutes in food products, there remains a demand for a shortening, butter and oil substitute which produces a final food product having a similar appearance, a similar texture and similar organoleptic properties as comparable goods which traditionally incorporate shortening, butter and oil without adding a fat component or increase the calorie content of the food product.

THE SUMMARY OF THE INVENTION

The present invention relates to an improved oil, butter and shortening substitute for food products especially bakery products such as cakes, breads, muffins, cookies and brownies to reduce the caloric content of such foods without sacrificing the appearance, texture and organoleptic properties of such foods. The improved shortening substitute is an improvement over traditional fruit puree substitutes for shortening, butter and oil such as applesauce in that the improved shortening substitute retains the natural ingredient components of a fruit puree substitute while producing food products having a similar taste, appearance and organoleptic properties of food products which were previously obtainable only by using a shortening, butter or an oil.

The improved shortening substitute includes a fruit puree which is combined with a sweetener such as sugar and/or corn syrup, a preservative for the fruit puree and water to obtain the desired consistency of the fruit puree mixture. In addition to these ingredients, a fat mimetic is added to improve the baiting properties of the fruit puree mixture to emulate the effect commonly associated with the addition of oil, butter and shortening to baked goods. Oil, butter and shortening have traditionally been added to baked goods to achieve a desired texture, moisture content, volume and taste of the food, properties which are important for baked goods such as cakes, breads, etc. The amount of fat mimetic added to the fruit puree mixture should be at least about 0.1 weight percent of the shortening substitute to provide a sufficient concentration of the fat mimetic to effect the desired results in the food products. The amount of the fat mimetic may constitute up to about 10% of the shortening substitute and is preferably about 0.5 to about 4.0% by weight of the shortening substitute. The fat mimetic complements the shortening, butter and oil replacement properties of the fruit puree while providing the additional desired taste, appearance, volume, texture, moisture content and organoleptic properties to food products which are traditionally associated with the addition of shortenings, butter and oils.

In accordance with another aspect of the present invention, the fat mimetic added to the shortening substitute is a pectin based fat mimetic such as a low methoxyl pectin. A low methoxyl pectin is particularly desirable in the present invention in that the low methoxyl pectin when mixed with water and a calcium ion source, produces a creamy consistency which has properties that closely emulate traditional shortening, butter and oil products in foods. The calcium ion source is used as a gelling agent that modifies the low methoxyl pectin during a homogenization process under high shear conditions to form a solution which produces the desired shortening, butter and oil emulating properties. One type of calcium ion source which can be used is calcium chloride. The amount of calcium ion source added is dependent on the amount of low methoxyl pectin added to the shortening substitute. Preferably, the calcium ion source makes up at least about 0.01% by weight of the shortening substitute.

In accordance with another aspect of the present invention, a pH adjuster is added to the shortening substitute to achieve the desired oil, butter and shortening substitution properties. It has been found that an acidic pH for the shortening substitute produces the most desirable results. Preferably, the pH should be maintained between about 2.7 to about 6.0 to achieve the optimum effects of the shortening substitute. To achieve the desired pH, a food acid such as ascorbic acid and/or citric acid is preferably added to obtain the desired acidic pH. Ascorbic acid addition is desirable in that it not only produces an acidic pH, ascorbic acid adds nutritional vitamins to the shortening substitute and helps inhibit the browning of the fruit puree.

In accordance with still another aspect of the present invention, a sweetener is added to the shortening substitute to obtain a brix value in the range of about 20% to about 60%. It has been found that a too low brix value or a too high brix value will make the shortening substitute too bitter or too sweet, respectively, and will adversely affect the viscosity of the shortening substitute. Increasing the brix value substantially above 60% causes the shortening substitute to become very sweet thereby affecting the taste of the final food product. Furthermore, a brix value substantially above 60% increases the viscosity of the shortening substitute to a point that the shortening substitute can adversely affect the appearance and texture of the food product and will not properly mix with the food product. A high viscosity also makes it difficult to dispense and measure the shortening substitute when being added to a food product. Conversely, brix values substantially below 20% do not impart proper flavoring to the shortening substitute thereby affecting the taste of the food product. Furthermore, a brix value substantially below 20% can cause the shortening substitute to be liquidy thereby adversely affecting a food product. The desired viscosity of the shortening substitute to produce a product which can be satisfactorily added to a food product and which can properly be mixed with the food product is obtained by preferably selecting a brix value of at least about 20% to about 60%.

In accordance with yet another aspect of the present invention, a food preservative is added to the shortening substitute to extend the shelf life of the shortening substitute. The addition of water, a sweetener and/or a food acid to the shortening substitute can reduce the shelf life of the shortening substitute even in a hermetically sealed environment. In order to extend the shelf life of the shortening substitute without adversely affecting the physical properties of the shortening substitute, a food preservative is preferably added to the shortening substitute.

In accordance with still yet another aspect of the present invention, an emulsifier is preferably added to the shortening substitute. The addition of emulsifiers has been found to improve the texture and browning of the baked goods. An emulsifier which is preferably added to the shortening substitute is lecithin. Lecithin is preferably added to the shortening substitute in an amount of at least about 0.1 weight percent of the shortening substitute.

The primary object of the present invention is the provision of a shortening, butter and oil substitute of the type used for food products such as bakery goods, dressings, casseroles, etc. which replaces the requirement in recipes of adding a shortening, oil, butter, margarine, vegetable and/or animal based cooking oils to the food product.

Another object of the present invention is the provision of a shortening substitute, as defined above, which composition includes no added shortening, butter or oil yet produces food products having the appearance, the texture and the organoleptic properties of a food product which traditionally includes shortening, butter or oil.

Still a further object of the present invention is the provision of a shortening substitute which is based upon a fruit puree mixture in combination with a fat mimetic to form a mixture having a significantly reduced caloric value as compared to oil, butter or shortening and which emulates the effects of shortening, butter and oil in a wide variety of food products.

Still yet another object of the present invention in the provision of a shortening substitute which is based upon a fruit puree mixture in combination with a fat mimetic and emulsifiers to form food products having a reduced caloric value as compared to oil, butter or shortening and which emulates the effects of shortening, butter and oil in such foods.

Another object of the present invention is the provision of a composition which includes a fruit puree, a particular brix value and a particular acidic pH value to form a mixture having the desired taste and the desired mixing properties necessary to be added to food products to create a food product which emulates the texture, appearance and organoleptic properties of food products which traditionally include the addition of shortening, butter and oils.

Yet another object of the present invention is the provision of a composition as defined above which is relatively simple and cost effective to manufacture and has an extended shelf life.

These and other objects and advantages will become apparent from the following description of the invention.

THE PREFERRED EMBODIMENT OF THE INVENTION

In accordance with a preferred embodiment of the present invention, there is provided an improved shortening, butter and oil substitute for food products and particularly for bakery products such as cakes, breads, muffins, cookies, brownies, etc. The shortening substitute, when used in bakery products, has been found to be effective in replacing the shortening, butter and/or oil content of such bakery goods as called for in scratch bakery recipes and/or boxed or ready-mixed recipes. The improved shortening substitute is a significant improvement over traditional shortening substitutes which constituted a fruit puree such as a puree of apples, apricots, prunes and/or plums. These prior shortening substitutes primarily were limited to oil, a butter and a shortening substituted in baked goods. However, even when such substitutes were used, the final baked product which resulted from the use of the fruit puree typically was different in appearance, volume, texture and/or its organoleptic properties as compared with comparable baked products which incorporated the use of an oil, butter and/or shortening. Consequently, these fruit purees were limited to custom recipes designed to be used with a specific type of fruit puree shortening substitute thereby limiting the general use of such shortening substitutes.

The improved shortening substitute of the present invention overcomes the deficiencies of prior fruit puree shortening substitutes by providing a shortening substitute which incorporates a unique blend of ingredients which allows the improved shortening substitute to be used in a wide variety of baked food products while still maintaining the taste, appearance, texture, volume and organoleptic properties of foods products which traditionally included shortening, butter and/or oil.

The shortening substitute includes a mixture of a fruit puree, a sweetener, water and a controlled amount of a fat mimetic. The fruit puree is preferably an apple puree; however, other types of fruit puree may be used in substitution for the apple puree or in combination with the apple puree to form the base component of the shortening substitute. Such other fruit purees may include apricot, plums, prunes, peaches, nectarines, pears. As can be appreciated, a fruit juice concentrate may be used as a substitute for the fruit puree. Furthermore, a vegetable puree can be added to or substituted for the fruit puree and/or fruit concentrate. The fruit puree may be unconcentrated or in concentrated form. If the fruit puree is in concentrated form, additional water is added to dilute the concentrate. The fruit puree is one of the primary components of shortening substitutes and provides the solids content and fiber content of the shortening substitute. The fruit puree content may constitute about 5.0 to about 50.0 weight percent of the shortening substitute. Water is added to the fruit puree to big the shortening substitute up to yield.

A sweetener is added to the shortening substitute to obtain the desired sweetness of the shortening substitute and the desired bulk, solids content and viscosity of the shortening substitute. Various types of sweeteners may be added to achieve the desired flavoring and viscosity of the shortening substitute. Such sweeteners include sugar, corn syrup, high fructose corn syrup, honey, polydextrose, etc. A portion of the sweetener can be substituted with maltodextrin for purposes of adding a bulking agent to the shortening substitute. The sweetener is added to provide bulk and solids to the shortening substitute and to obtain a brix value of the shortening substitute of at least about 10%. Preferably, the brix value is maintained between about 20% to about 60%. Brix values of about 40% have been found to create an improved shortening substitute which can be used in a wide variety of bakery products. Brix values below about 10% have been found to produce a shortening substitute which creates a bitter and/or non-traditional flavor to the bakery products. Brix values which substantially exceed about 60% have been found to create a shortening substitute which is highly viscous and difficult to mix with a batter used in a bakery product. In addition, the high brix value has a tendency to produce a sweet after taste in the bakery products due to the high sweetener content in the shortening substitute. Brix values of about 20% to about 60% have been found to not adversely affect the taste of the bakery products. The fat mimetic which is included in the shortening substitute is preferably a pectin based fat mimetic. One type of pectin based fat mimetic which has been found to perform particularly well is a low methoxyl pectin similar to the type which is marketed by Hercules, Inc. under the tradename "Slendid". This fat mimetic is available in a powder form and upon the addition of water forms a solution having a creamy consistency when homogenized under high shear conditions. It has been found that when the low methoxyl pectin and water solution is combined with a gelling aid such as a calcium ion source, the solution is transformed into a gel type solution which upon being homogenized, produces a solution having fat mimicking characteristics. The fat mimetic is preferably present in the shortening substitute in an amount of at least about 0.1% by weight and preferably does not exceed 10% by weight of the shortening substitute. Concentrations of the fat mimetic which are substantially below 0.1 weight percent create a shortening substitute which does not exhibit any apparent advantages as to taste, texture and organoleptic properties of baked goods as compared to standard fruit puree shortening substitutes. Concentrations of the fat mimetic which substantially exceed about 10 weight percent creates a highly viscous shortening substitute which is difficult to be properly mixed with a batter for use in a bakery product. Furthermore, the additional addition of large amounts of the fat mimetic does not substantially improve the characteristics of the shortening substitute with respect to creating a better bakery product and can, in certain baked goods, adversely affect the properties of the baked goods. Preferably about 0.5 to about 4.0% by weight of the fat mimetic is added to the shortening substitute to obtain the desired improved oil, butter and shortening effects. As can be appreciated, other fat mimetics can be substituted partially or whole for the pectin based fat mimetic. These substitutes include starch based fat mimetics, cellulose gum based fat mimetic, carragenans, alginate, protein based fat mimetics, oat based fat mimetics and/or maltodextrin. When low methoxyl pectin is used as the fat mimetic, a calcium ion source is used as a gelling agent such as calcium chloride. When calcium chloride is used, it is preferably added in an amount of about 0.01 to about 0.5 weight percent of the shortening substitute. Other calcium ion sources may be used such as calcium carbonate and/or calcium sulfate.

The pH of the shortening substitute has been found to effect the properties of the shortening substitute. An acidic shortening substitute has been found to function the best in baked goods. Preferably the pH of the shortening substitute is maintained between about 2.9 to about 6.0 and more preferably about 3 to about 4. A food acid such as citric acid and/or ascorbic acid is preferably added to the shortening substitute to obtain the desired pH levels. However, it can be appreciated that other types of food acids may be added to the shortening substitute to achieve similar results. Ascorbic acid is preferably added to the shortening substitute to help prevent the browning and discoloration of the shortening substitute. Ascorbic acid also adds important vitamins to the shortening substitute such as vitamin C. As can be appreciated, additional vitamin source may be added to the shortening substitute.

A preservative is also preferably added to the shortening substitute to extend the shelf life of the shortening substitute. The preservative prevents the degradation and the spoilage of the fruit puree thereby extending the shelf life of the shortening substitute. The preservative selected should be one which can actively combat the growth of mold at a pH of about 2.9 to about 6.0. Preferably, a preservative such as potassium sorbate, sodium bisulfate, sulfur dioxide or the like may be used as a preservative for the shortening substitute.

The shortening substitute preferably includes an emulsifier. The emulsifier addition has been found to improve the texture and browning of baked goods. The emulsifier, if added, should be present in amounts of at least about 0.1 weight percent of the shortening substitute. An emulsifier concentration below 0.1 weight percent has been found to add no noticeable advantage to the shortening substitute when used in baked goods. An emulsifier concentration above 4.0 weight percent has been found to offer no additional benefits to the shortening substitute and can adversely effect some baked goods. An emulsifier which has been found to particularly enhance the properties of the shortening substitute is lecithin.

A general formulation of the shortening substitute is as follows:

| Ingredients | Weight Percent Range |
| --- | --- |
| Fruit puree or fruit juice | 5–50 |
| Sweetener | 5–60 |
| Calcium Ion Source | 0.0–0.5 |
| Food Acid | 0.01-0.2 |
| Antioxidant | 0.0–0.35 |
| Preservative | 0.0–0.2 |
| Fat Mimetic | 0.1–4.0 |
| Emulsifiers | 0.0–4.0 |
| Water | 10–75 |

The shortening substitute formulated from the above general formulation preferably has a brix value of 20–60 and a pH of 2.0 to 6.0.

A specific example of the shortening substitute is as follows:

| Ingredient | Lbs. |
| --- | --- |
| Apple Puree Concentrate | 11.63 |
| Corn Syrup | 42.36 |
| Calcium Chloride | 0.09 |
| Citric Acid | 0.10 |
| Ascorbic Acid | 0.12 |
| Potassium Sorbate | 0.20 |
| Low Methoxyl Pectin | 1.09 |
| Lecithin | 0.74 |
| Water | 43.67 |

The brix value of the shortening substitute is about 35–45 and the pH is about 3–4.

In preparing the shortening substitute, the fruit puree, sweetener, calcium chloride and water are blended together under low shear environments. The mixture is then heated to about 165° F. In a separate container, the low methoxyl pectin is mixed with warm water under high shear conditions to create a solution having a creamy consistency. The mixture is then heated to about 170° F. During the mixing process, the lecithin is added, if it is being used. The creamy solution is then blended with the solution of fruit puree. A food acid and a preservative are added to the mixture to adjust the pH and prevent oxidation of the final mixture. The final mixture is then cooked under vacuum conditions to obtain the appropriate solid level and subsequently homogenized to obtain the final improved shortening substitute product. The homogenization process occurs under high shear conditions and at about 2500 psi to microparticulate the mixture to a particle size of about 5 to 100 microns.

The improved shortening substitute was tested on a variety of popular bakery items such as cakes and cookies. Both convenience mixes and scratch recipes were evaluated. In making a comparison of the advantages of the improved shortening substitute to standard fruit purees, the improved shortening substitute was compared with applesauce. Both the improved shortening substitute and the applesauce were compared to a control bakery product which included the standard additions of shortening, oil and/or butter. The tests were conducted wherein the improved substitute was added in an equal replacement value and a half replacement value to the listed amount of oil, butter or shortening on the various type of bakery goods. An equal replacement value for the applesauce to the oil, butter or shortening was tested as recommended by Motts.

EXAMPLE 1 (CAKES)

A Pillsbury white cake was selected to determine the effectiveness of the improved shortening substitute in convenient cake mixes. The Pillsbury white cake called for ⅓ cup of oil to be added to the cake mix. It was found that equal replacement and half replacement values of the improved shortening substitute produced a white cake having a very acceptable to excellent appearance with respect to color, height and surface gloss and such cake was very similar to the control cake which included ⅓ cup of oil. Furthermore, it was found that the addition of the improved shortening substitute produced a white cake having a very similar texture and cut appearance as compared to the control cake. The cake containing the improved shortening substitute also was moist and had an acceptable keeping quality. Finally, the flavor of the cake including in the improved shortening substitute was very acceptable in taste and very similar in taste to the control cake.

The white cake which included the applesauce as an oil substitute produced a cake which was sticky to touch, was much sweeter than the control cake and had a slightly sticky texture when consumed. Furthermore, the cake which included the applesauce produced a dryer cake than that of the control cake.

EXAMPLE 2 (CHOCOLATE CHIP COOKIES)

A convenience mix of Duncan Hines chocolate chip cookies was tested with the improved shortening substitute and applesauce. The baking appearance of the chocolate chip cookies containing equal and half replacement values of the improved shortening substitute were very close to the control cookies which included a ⅓ cup of oil. The texture and taste of the chocolate chip cookies which included the improved shortening substitute also closely imitated the control group of chocolate chip cookies.

The chocolate chip cookies which included applesauce as the oil substitute produced a slightly puffy cookie having a cake like texture and taste and produced a flavor which was dissimilar from the control group of chocolate chip cookies.

A scratch recipe for chocolate chip cookies obtained from a package of Nestle Toll House chocolate chips was also used as a comparison to test. This cookie recipe required a half-cup of butter. The cookies which included equal and half replacement values of the improved shortening substitute were once again very similar in appearance, texture and taste to that of the cookies produced by the scratch recipe. The cookies which included applesauce once again produced a puffy, cake like cookie which had a tough, cake like texture which was not at all similar to the control group of chocolate chip cookies. Furthermore, the chocolate chip cookies which included applesauce were extremely sticky and became very chewy, tough and stale when kept refrigerated over a short period of time. The cookies which included the improved shortening substitute were found to have an excellent keeping quality and did not stick together when stored.

The improved shortening substitute out performed standard fruit puree substitutes such as applesauce in a wide variety of baked goods. The improved shortening substitute produced generally good results for both scratch recipe mixes and convenience recipe mixes. A replacement ratio of about ½ the volume of the improved shortening substitute to the requested oil, shortening and/or butter content of a convenience mix or scratch mix was found to produce the most acceptable results in a wide variety of bakery products. The improved shortening substitute produced a bakery product having better texture and keeping quality than products produced from applesauce. In many applications, products including applesauce exhibited a sticky touch or mouth feel and produced a much dryer and hard product as compared to the products containing the improved shortening substitute. Products which include the improved shortening substitute did not discolor bakery goods and did not produce off-flavored or undue sweetness when added to both scratch mixes and convenience mix products. The improved shortening substitute also produced baked goods having the same appearance of oil, butter or shortening containing baked goods with respect to texture and browning baked. Goods containing the applesauce substitute typically did not brown properly. In summary, the improved shortening substitute produced a wide variety of baked goods that had very similar or the same appearance, texture and taste of comparable baked goods which contained oil, butter or shortening.

The invention has been described with reference to a preferred embodiment and alternates thereof. It is believed that many modifications and alterations of the embodiments disclosed will readily suggest themselves to those skilled in the art upon reading and understanding the detailed description of the invention. It is intended to include all such modifications and alterations insofar as they come within the scope of the present invention.

We claim:

1. An improvement in a shortening substitute for a batter used in a bakery product from the group consisting of cakes, breads, muffins, cookies and brownies, said shortening substitute including a mixture of a fruit puree, a sweetener, a preservative and water, said improvement comprising the addition of at least about 0.1% by weight a fat mimetic to said shortening substitute, and an emulsifier.

2. An improved shortening substitute as defined in claim 1, wherein said emulsifier includes lecithin in an amount of at least about 0.1 percent by weight of said shortening substitute.

3. An improvement in a shortening substitute for a batter used in a bakery product from the group consisting of cakes, breads, muffins, cookies and brownies, said shortening substitute including a mixture of a fruit puree, a sweetener, a preservative and water, said improvement comprising the addition of at least about 0.1% by weight a fat mimetic, a pH adjuster and an emulsifier to said shortening substitute, said fat mimetic being a pectin based fat mimetic including a low methoxyl pectin, said pH adjuster added to control the pH between about 2.9 to about 6.0.

4. An improvement in a shortening substitute for a batter used in a bakery product from the group consisting of cakes, breads, muffins, cookies and brownies, said shortening substitute including a mixture of a fruit puree, a sweetener, a preservative and water, said improvement comprising the addition of at least about 0.1% by weight a fat mimetic, a pH adjuster, an emulsifier and a calcium ion source to said shortening substitute, said fat mimetic is a pectin based fat mimetic, including a low methoxyl pectin, said pH adjuster includes citric acid to control the pH between about 2.9 to about 6.0.

5. An improvement in a shortening substitute for a batter used in a bakery product from the group consisting of cakes, breads, muffins, cookies and brownies, said shortening substitute including a mixture of a fruit puree, a sweetener, a preservative and water, said improvement comprising the addition of at least about 0.1% by weight a fat mimetic, a pH adjuster, an emulsifier, and a calcium ion source to said shortening substitute, said fat mimetic is a pectin based fat mimetic including a low methoxyl pectin, said pH adjuster including citric acid to control the pH between about 2.9 to about 6.0, said calcium ion source includes calcium chloride, and said sweetener is added to create a brix in the range of about 20% to about 60%.

6. An improved shortening substitute as defined in claim 5, wherein said substitute comprises:

| Fruit Puree | 5–50% |
|---|---|
| Sweetener | 10–60% |
| Calcium Ion Source | 0.01–0.5% |
| Food Acid | 0.05–0.2% |
| Antioxidant | 0.0–0.35% |
| Preservative | 0.0–0.2% |
| Fat Mimetic | 0.1–10% |
| Emulsifiers | up to 4.0% |
| Water | 10–75%. |

7. An improved shortening substitute as defined in claim 6, wherein said fat mimetic constitutes about 0.1 to about 4%.

8. An improved shortening substitute as defined in claim 6, wherein said emulsifier includes lecithin in an amount of at least about 0.1 percent by weight of said shortening substitute.

9. An improvement in a shortening substitute a mixture of a fruit puree, a sweetener, a preservative and water, said improvement comprising the addition of about 0.1% to about 4% by weight fat mimetic, emulsifiers, a pH adjuster and a source of calcium ions, said fat mimetic is a pectin based fat mimetic, and said pH adjuster forming an acidic shortening substitute.

10. An improved shortening substitute as defined in claim 9, wherein said pH adjuster includes citric acid.

11. An improved shortening substitute as defined in claim 9, wherein said calcium ion source includes calcium chloride.

12. An improved shortening substitute as defined in claim 11, wherein said emulsifier includes lecithin.

13. An improved shortening substitute as defined in claim 9, wherein said sweetener is added to create a brix in the range of about 20% to about 60%.

14. An improved shortening substitute as defined in claim 13, wherein said emulsifier includes lecithin.

15. An improved shortening substitute as defined in claim 9, wherein said fat mimetic is a pectin based fat mimetic.

16. An improved shortening substitute as defined in claim 9, including a pH adjuster to control the pH between about 2 to about 6.

17. An improved shortening substitute as defined in claim 16, including a pH adjuster to control the pH between about 3.0 to about 4.0.

18. An improved shortening substitute as defined in claim 17, wherein said pH adjuster includes citric acid.

19. An improved shortening substitute as defined in claim 18, wherein said calcium ion source includes calcium chloride.

20. An improved shortening substitute as defined in claim 19, wherein said sweetener is added to create a brix in the range of about 20% to about 60%.

21. An improved shortening substitute as defined in claim 20, wherein said emulsifier includes lecithin.

22. An improved shortening substitute as defined in claim 21, wherein said substitute comprises:

| Fruit Puree | 5–50% |
|---|---|
| Sweetener | 10–60% |
| Calcium Ion Source | 0.01–0.5% |
| Food Acid | 0.05–0.2% |
| Antioxidant | 0.0–0.35% |
| Preservative | 0.0–0.2% |
| Fat Mimetic | 0.1–4.0% |
| Emulsifiers | up to 4.0% |
| Water | 10–75%. |

23. An improved shortening substitute as defined in claim 22, wherein said substitute comprises:

| Apple Puree Concentrate | 5–20% |
|---|---|
| Sweetener | 30–50% |
| Calcium Chloride | 0.05–0.2% |
| Citric Acid | 0.05–0.2% |
| Ascorbic Acid | 0.05–0.25% |
| Potassium Sorbate | 0.05–0.4% |
| Low Methoxyl Pectin | 0.5–2.0% |
| Lecithin | 0.5–2.0% |
| Water | 30–60%. |

24. An improved shortening substitute as defined in claim 23, wherein said emulsifier includes lecithin in an amount of at least about 0.1 percent by weight of said shortening substitute.

25. An improved shortening substitute as defined in claim 17, wherein said sweetener is added to create a brix in the range of about 20% to about 60%.

26. An improved shortening substitute as defined in claim 17, wherein said emulsifier includes lecithin.

27. An improved shortening substitute as defined in claim 9, wherein said emulsifier includes lecithin.

28. An improved shortening substitute as defined in claim 27, wherein said emulsifier includes lecithin in an amount of at least about 0.1 percent by weight of said shortening substitute.

29. An improved shortening substitute as defined in claim 9, wherein said substitute comprises:

| Fruit Puree | 5–50% |
|---|---|
| Sweetener | 10–60% |
| Calcium Ion Source | 0.01–0.5% |
| Food Acid | 0.05–0.2% |
| Antioxidant | 0.0–0.35% |
| Preservative | 0.0–0.2% |
| Fat Mimetic | 0.1–4.0% |
| Emulsifiers | 0.0–4.0% |
| Water | 10–75%. |

30. An improved shortening substitute as defined in claim 29, wherein said substitute comprises:

| Apple Puree Concentrate | 5–20% |
|---|---|
| Sweetener | 30–50% |
| Calcium Chloride | 0.05–0.2% |
| Citric Acid | 0.05–0.2% |
| Ascorbic Acid | 0.05–0.25% |
| Potassium Sorbate | 0.05–0.4% |
| Low Methoxyl Pectin | 0.5–2.0% |
| Lecithin | 0.5–2.0% |
| Water | 30–60%. |

31. An improved shortening substitute as defined in claim 9, wherein said pH adjuster includes an acid selected from the group consisting of ascorbic acid, citric acid and mixtures thereof.

32. An improved shortening substitute as defined in claim 9, wherein said fruit puree includes a fruit selected from the group consisting of apples, prunes, apricots, plums, pears, peaches, nectarines and mixtures thereof.

33. An improved shortening substitute as defined in claim 9, wherein said preservative includes potassium sorbate.

34. An improvement in a shortening substitute for a batter used in a bakery product from the group consisting of cakes, breads, muffins, cookies and brownies, said shortening substitute including a mixture of a fruit puree, a sweetener, a preservative, an emulsifier and water, said substitute comprises:

| Fruit Puree | 5–50% |
|---|---|
| Sweetener | 10–60% |
| Calcium Ion Source | 0.01–0.5% |
| Food Acid | 0.05–0.2% |
| Antioxidant | 0.0–0.35% |
| Preservative | 0.0–0.2% |
| Fat Mimetic | 0.1–10% |
| Emulsifiers | [0.0–4.0%]0.1%–4% |
| Water | 10–75%. |

35. An improved shortening substitute as defined in claim 34, including a calcium ion source.

36. An improved shortening substitute as defined in claim 35, wherein said calcium ion source includes calcium chloride.

37. An improved shortening substitute as defined in claim 35, wherein said sweetener is added to create a brix in the range of about 20% to about 60%.

38. An improved shortening substitute as defined in claim 19, wherein said sweetener is added to create a brix in the range of about 20% to about 60%.

39. An improved shortening substitute as defined in claim 34, wherein said fat mimetic is a pectin based fat mimetic.

40. An improved shortening substitute as defined in claim 39, wherein said fat mimetic is a low methoxyl pectin.

41. An improved shortening substitute as defined in claim 40, including a pH adjuster to control the pH between about 2.7 to about 6.0.

42. An improved shortening substitute as defined in claim 41, wherein said pH adjuster includes citric acid.

43. An improved shortening substitute as defined in claim 42, including a calcium ion source.

44. An improved shortening substitute as defined in claim 43, wherein said calcium ion source includes calcium chloride.

45. An improved shortening substitute as defined in claim 44, wherein said sweetener is added to create a brix in the range of about 20% to about 60%.

46. An improved shortening substitute as defined in claim 41, wherein said sweetener is added to create a brix in the range of about 20% to about 60%.

47. An improved shortening substitute as defined in claim 40, including a calcium ion source.

48. An improved shortening substitute as defined in claim 34, including a pH adjuster to control the pH between about 2 to about 6.

49. An improved shortening substitute as defined in claim 48, including a pH adjuster to control the pH between about 2.7 to about 6.0.

50. An improved shortening substitute as defined in claim 34, wherein said fat mimetic constitutes about 0.1 to about 4%.

51. A method of producing an improved shortening substitute which can be wholly or partially substituted for the oil, butter and shortening content of foods, said method comprising the steps of:

a) selecting a fruit puree or fruit concentrate;
 b) mixing said fruit puree or fruit concentrate with a sweetener and water to form a fruit mixture;
 c) selecting a fat mimetic;
 d) mixing said fat mimetic with said fruit mixture to form a fruit-fat mimetic mixture; and,
 e) adding a food acid and an emulsifier to said fruit-fat mimetic mixture thereby forming said shortening substitute comprising:

| Fruit Puree | 5–50% |
|---|---|
| Sweetener | 10–60% |
| Calcium Ion Source | 0.01–0.5% |
| Food Acid | 0.05–0.2% |
| Antioxidant | 0.0–0.35% |
| Preservative | 0.0–0.2% |
| Fat Mimetic | 0.1–10% |
| Emulsifiers | [0.0–4.0%]0.1%–4% |
| Water | 10–75%, | said emulsifier includes lecithin in an amount of at least about 0.1 percent by weight of said shortening substitute.

52. A method as defined in claim 51, wherein said fruit puree includes a fruit selected from the group consisting of apples, prunes, apricots, plums, pears, nectarines, peaches and mixtures thereof.

53. A method as defined in claim 51, wherein said sweetener is added to form a shortening substitute having a brix value about 30 to about 50.

54. A method as defined in claim 51, wherein said sweetener includes a compound selected from the group consisting of sugar, corn syrup, high fructose corn syrup, honey, polydextrose, maltodextrin and mixtures thereof.

55. A method as defined in claim 51, wherein said food acid includes a compound selected from the group consisting of citric acid, ascorbic acid and mixtures thereof.

56. A method as defined in claim 51, wherein said fat mimetic is a pectin based fat mimetic.

57. A method as defined in claim 56, wherein said fat mimetic is a low methoxyl pectin.

58. A method as defined in claim 57, including the step of adding a calcium ion source to said fruit fat mimetic mixture, said calcium ion source including a calcium compound selected from the group consisting of calcium chloride, calcium carbonate, calcium sulfate and mixtures thereof.

59. A method as defined in claim 51, wherein said food acid is added to an amount to obtain a pH between about 2 to about 6.

60. A method as defined in claim 51, wherein said fat mimetic constitutes about 0.1 to about 4%.

61. A method of producing an improved shortening substitute which can be wholly or partially substituted for the oil, butter and shortening content of foods, said method comprising the steps of:

a) selecting a fruit puree or fruit concentrate;

b) mixing said fruit puree or fruit concentrate with a sweetener and water to form a fruit mixture:

c) selecting fat mimetic;

d) mixing said fat mimetic with said fruit mixture to form a fruit-fat mimetic mixture; and, e) adding a food acid to said fruit-fat mimetic mixture to form said shortening substitute; and, f) adding an emulsifier to said fruit-fat mimetic mixture.

* * * * *